March 15, 1966 B. ROSAEN 3,240,341
MAGNETIZED GASKET ASSEMBLY
Filed Jan. 14, 1963
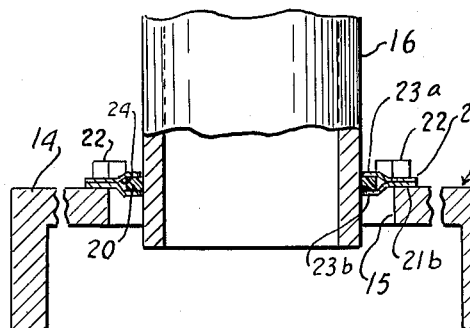
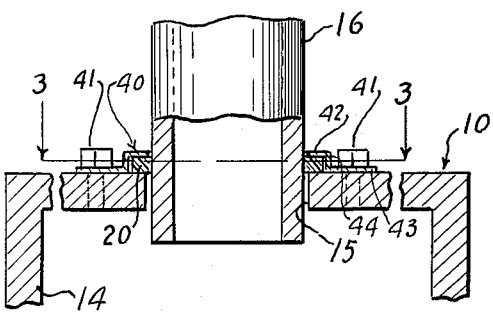
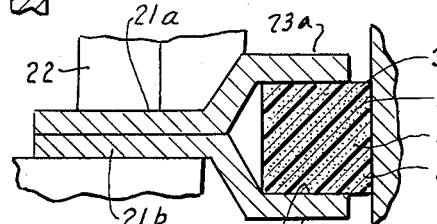
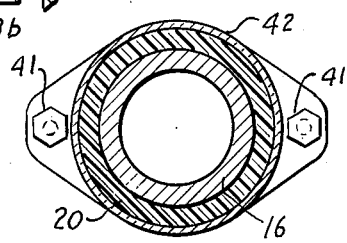
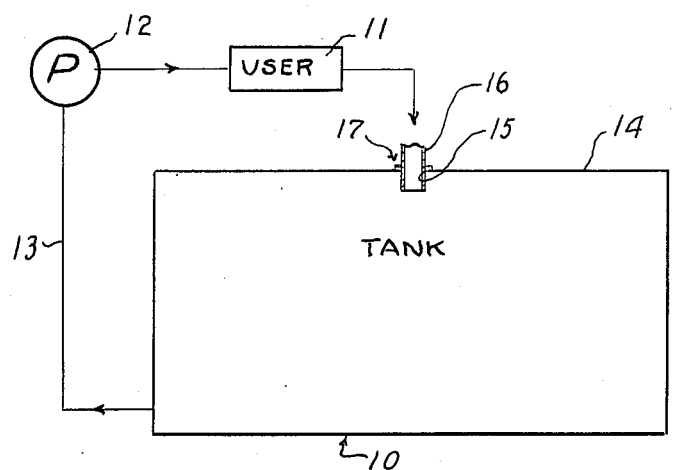
INVENTOR.
BORGE ROSAEN
BY
Hauke + Hauke
ATTORNEYS 3,240,341
MAGNETIZED GASKET ASSEMBLY
Borge Rosaen, Ann Arbor, Mich., assignor to The Rosaen Filter Company, Hazel Park, Mich., a corporation of Michigan
Filed Jan. 14, 1963, Ser. No. 251,196
3 Claims. (Cl. 210—222)

The present invention relates to fluid systems and more particularly to an inlet pipe retainer assembly for the fluid reservoir for such a system.

In fluid systems used with metal working machinery metallic chips and the like often find their way into the fluid being used and must be removed to prevent damage to the working parts of the system.

It is an object of the present invention to reduce wear and damage to the working parts of a fluid system by providing means operable to collect metallic chips and the like from the fluid being used.

It is a further object of the present invention to reduce the costs of producing a simply constructed relatively inexpensive means for removing metallic foreign matter from the fluid being used.

It is still another object of the present invention to facilitate the removal of metallic chips and the like from fluid systems by providing a magnetic gasket member and means positioning said gasket member adjacent the reservoir inlet pipe in such a system.

It is yet another object of the present invention to prevent metallic matter from entering the reservoir of a fluid system by providing a gasket adapted for providing a seal between the inlet pipe and the reservoir, said gasket being impregnated with magnetic particles whereby metallic matter in the fluid will be attracted and retained by the magnets.

Still further objects will be readily apparent to those skilled in the art to which the present invention pertains upon reference to the following drawings in which like reference characters refer to like parts throughout the several views and in which:

FIG. 1 is a fragmentary view partly in section illustrating one preferred embodiment of the present invention.

FIG. 2 is a fragmentary sectional view similar to FIG. 1 but illustrating another preferred embodiment of the present invention.

FIG. 3 is a cross sectional view as seen substantially from line 3—3 of FIG. 2.

FIG. 4 is a cross sectional view of a gasket member of the present invention enlarged somewhat for purposes of clarity.

FIG. 5 is a schematic view of a fluid system employing the present invention.

Now referring to the drawings for a more detailed description of the present invention, FIG. 5 illustrates schematically a preferred fluid system as comprising a fluid reservoir 10, a fluid user 11, a pump 12 and conducting means 13 for delivering fluid from the reservoir 10 to the user 11 and then back to the reservoir 10 again. The reservoir 10 preferably comprises a housing 14 being provided with an inlet opening 15. The conducting means 13 preferably comprises an inlet pipe 16 extending into the reservoir 10 through the inlet opening 15. A gasket and retainer assembly is indicated generally at 17 in FIG. 5 and will be described in more detail below.

One preferred gasket and retainer assembly of the present invention is illustrated in FIG. 1 as comprising an annular gasket member 20 which is carried in a position engaging the outer periphery of the inlet pipe 16. Retaining members 21a–21b are adapted to be removably secured to the housing 14 preferably by bolts 22 and each is preferably provided with a radially inwardly extending flange portion 23a–23b respectively. The flange portions 23a–23b are axially spaced as shown so that the retainer members 21a–b form a substantially Y shape in section and provide an annular slot 24 in which the gasket member 20 is carried.

The gasket member 20 as can best be seen in FIG. 4 is preferably constructed of a suitable resilient fluid resistant sealing material 30 impregnated with a plurality of magnetic particles 31. It is to be noted that the size of the magnetic particles 31 has been enlarged in FIG. 4 for purposes of clarity and that in practicing the present invention a gasket has been used in which the magnetic particles 31 cannot be seen with the naked eye.

FIGS. 2 and 3 illustrate another preferred embodiment of the present invention which utilizes another preferred retaining member 40. The retaining member 40 is adapted to be removably secured to the housing 14 by any means such as bolts 41 and preferably comprises an inwardly radially extending annular flange portion 42 which is spaced from a base portion 43 by an axially extending medial portion 44 so that the retaining member 40 is substantially Z-shaped in cross section. The gasket 20 is retained between the flange 42 and the housing 14.

It is apparent that since the gasket 20 is constructed primarily of a resilient material, tightening of the bolts 22 or 41 to axially compress the gasket 20 will produce radial deformation which will produce an effective seal between the inlet pipe 16 and the reservoir housing 14. The magnet members 31 will produce a magnetic field within the interior of the inlet pipe 16 which will attract and retain metallic matter in the fluid and prevent same from entering the reservoir 10 from whence it could produce damage to the pump 12 or the user 15.

Although it has been preferred to illustrate the fluid system without a filter device, it is apparent that the magnetic gasket means of the present invention would be useful in such a system as well. The use of the presently disclosed magnet means would increase the life of the filter device by reducing the amount of foreign matter such a device would be called upon to remove from the fluid system. The task of a filter device in such a system would be reduced primarily to the removal of non-metallic foreign matter from the fluid.

Although I have described but two embodiments of the present invention, it is apparent that other changes and modifications may be made without departing from the spirit of the invention or the scope of the appended claims.

I claim:
1. In a fluid system having a fluid user, a fluid reservoir having an opening in a wall thereof, means conducting fluid from said reservoir to said user and back to said reservoir again, said conducting means including a pipe extending through said opening into said reservoir, and means for sealing the connection between said pipe and said reservoir at said opening and for collecting metallic matter from fluid flowing through said pipe, said sealing and collecting means comprising
  (a) an annular flexible fluid resistant means disposed around said pipe intermediate said reservoir and the exterior surface of said pipe,
  (b) an annular retainer member secured to said reservoir and retaining said flexible member in position intermediate said reservoir and said pipe,
  (c) said retainer member including annular means for confining and axially compressing said flexible member whereby said flexible member is deformed radially into sealing engagement with the exterior surface of said pipe,
  (d) a plurality of magnetized particles embedded in said flexible member whereby metallic matter is collected from the fluid flowing through said pipe.

2. The combination as defined in claim 1 and in which said retainer member comprises
 (a) a radially extending flange axially spaced from said reservoir,
 (b) said flexible member being disposed intermediate said flange and said reservoir and
 (c) said axial compressing means comprising means for urging said flange axially toward said reservoir.

3. The combination as defined in claim 1 and in which said retainer member comprises
 (a) a pair of axially spaced radially extending flanges engaging opposing surfaces of said flexible member, and
 (b) said axial compressing means comprising means for urging said flanges one towards the other.

References Cited by the Examiner
UNITED STATES PATENTS

| | | | |
|---|---|---|---|
| 2,589,766 | 3/1952 | Bradley | 277—80 |
| 2,670,847 | 3/1954 | Egloff et al. | 210—222 |
| 2,711,248 | 6/1955 | Roe | 210—222 X |
| 2,959,832 | 11/1960 | Baermann | 210—222 X |

REUBEN FRIEDMAN, *Primary Examiner.*

HARRY B. THORNTON, *Examiner.*